United States Patent
Li (10) Patent No.: US 11,237,001 B2
(45) Date of Patent: Feb. 1, 2022

(54) METHOD, APPARATUS, AND TERMINAL FOR OBTAINING ROUTE

(71) Applicant: Huawei Technologies Co., Ltd., Shenzhen (CN)

(72) Inventor: Guoliang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 318 days.

(21) Appl. No.: 16/490,827

(22) PCT Filed: May 23, 2017

(86) PCT No.: PCT/CN2017/085586
§ 371 (c)(1),
(2) Date: Sep. 3, 2019

(87) PCT Pub. No.: WO2018/157482
PCT Pub. Date: Sep. 7, 2018

(65) Prior Publication Data
US 2019/0390959 A1    Dec. 26, 2019

(30) Foreign Application Priority Data

Mar. 3, 2017 (CN) .......................... 201710124499.0

(51) Int. Cl.
*G01C 21/12* (2006.01)
*G01C 21/34* (2006.01)
(Continued)

(52) U.S. Cl.
CPC ......... *G01C 21/12* (2013.01); *G01C 21/3446* (2013.01); *G01C 21/3484* (2013.01);
(Continued)

(58) Field of Classification Search
CPC combination set(s) only.
See application file for complete search history.

(56) References Cited

U.S. PATENT DOCUMENTS

| 2004/0246147 A1* | 12/2004 | von Grabe | ....... G08G 1/096811 |
| | | | 340/995.13 |
| 2009/0023421 A1* | 1/2009 | Parkulo | .................. A62B 9/006 |
| | | | 455/404.2 |

(Continued)

FOREIGN PATENT DOCUMENTS

| AU | 2012296566 A1 * | 2/2014 | .......... G01S 5/0072 |
| CN | 101355391 A | 1/2009 | |

(Continued)

OTHER PUBLICATIONS

Machine Translation and Abstract of Chinese Publication No. CN101355391, Jan. 28, 2009, 13 pages.

(Continued)

*Primary Examiner* — Babar Sarwar
(74) *Attorney, Agent, or Firm* — Conley Rose, P.C.

(57) ABSTRACT

A method, apparatus, and terminal for obtaining a route are provided, including techniques and related apparatus for: obtaining, by a terminal, a first moment at which a signal in the terminal disappears and first location information of the terminal at the first moment, and performing dead reckoning starting from the first moment; obtaining, by the terminal, a second moment at which a user sends a distress signal and second location information of the terminal at the second moment, and ending the dead reckoning, to obtain a first dead reckoning curve; and determining, by the terminal, a track of a traveled route based on the first moment, the second moment, the second location information, the first dead reckoning curve, and each moment between the first moment and the second moment.

20 Claims, 5 Drawing Sheets

(51) Int. Cl.
*G01S 11/06* (2006.01)
*H04W 4/02* (2018.01)

(52) U.S. Cl.
CPC .......... *G01C 21/3492* (2013.01); *G01S 11/06* (2013.01); *H04W 4/025* (2013.01)

(56) References Cited

U.S. PATENT DOCUMENTS

| | | | |
|---|---|---|---|
| 2011/0215903 A1* | 9/2011 | Yang | G01C 21/20 340/8.1 |
| 2014/0244110 A1* | 8/2014 | Tharaldson | G06Q 50/01 701/36 |
| 2016/0044462 A1* | 2/2016 | Li | H04W 4/023 455/456.3 |
| 2017/0102467 A1* | 4/2017 | Nielsen | G01S 19/47 |
| 2017/0146661 A1* | 5/2017 | Hwang | H04W 4/40 |
| 2018/0192391 A1* | 7/2018 | Venkatraman | G01S 5/06 |

FOREIGN PATENT DOCUMENTS

| | | | | |
|---|---|---|---|---|
| CN | 103108390 A | | 5/2013 | |
| CN | 103428628 A | | 12/2013 | |
| CN | 103697902 A | * | 4/2014 | ............... A23F 3/06 |
| CN | 103697902 A | | 4/2014 | |
| CN | 103759736 A | | 4/2014 | |
| CN | 105758396 A | | 7/2016 | |
| EP | 3171202 A1 | * | 5/2017 | ............. H04W 4/90 |
| JP | 2011043336 A | | 3/2011 | |

OTHER PUBLICATIONS

Machine Translation and Abstract of Chinese Publication No. CN103108390, May 15, 2013, 13 pages.
Machine Translation and Abstract of Chinese Publication No. CN103428628, Dec. 4, 2013, 14 pages.
Machine Translation and Abstract of Chinese Publication No. CN103697902, Apr. 2, 2014, 24 pages.
Machine Translation and Abstract of Chinese Publication No. CN103759736, Apr. 30, 2014, 13 pages.
Machine Translation and Abstract of Chinese Publication No. CN105758396, Jul. 13, 2016, 16 pages.
Machine Translation and Abstract of Japanese Publication No. JP2011043336, Mar. 3, 2011, 16 pages.
Foreign Communication From A Counterpart Application, PCT Application No. PCT/CN2017/085586, English Translation of International Search Report dated Sep. 20, 2017, 2 pages.
Foreign Communication From A Counterpart Application, PCT Application No. PCT/CN2017/085586, English Translation of Written Opinion dated Sep. 20, 2017, 4 pages.

\* cited by examiner

METHOD, APPARATUS, AND TERMINAL FOR OBTAINING ROUTE

CROSS-REFERENCE TO RELATED APPLICATIONS

This application is a U.S. National Stage of International Patent Application No. PCT/CN2017/085586, filed on May 23, 2017, which claims priority to Chinese Patent Application No. 201710124499.0, filed on Mar. 3, 2017, both of which are hereby incorporated by reference in their entireties.

TECHNICAL FIELD

Embodiments of this application relate to the field of communications technologies, and in particular, to a method, apparatus, and terminal for obtaining a route.

BACKGROUND

In recent years, more people actively participate in outdoor activities because they can improve their physical health and broaden their horizons through outdoor activities. However, outdoor activities are often accompanied with some accidents. Usually, when people are lost outdoors, they are often unable to seek help from the outside due to a lack of mobile phone signals, and then keep trying to contact the outside in or around a place until their mobile phones run out of power, eventually putting themselves in danger.

Currently, in actual life, common positioning technologies include a satellite positioning technology and a base station positioning technology. The satellite positioning technology accurately locates a mobile phone by using a satellite. Generally, when a mobile phone enables a positioning system for the first time, it may take several minutes to obtain a rough range, and then further obtain an accurate point. Therefore, satellite positioning can provide relatively precise location information, but has huge power consumption. If the satellite positioning system is always enabled during outdoor activities, it is very likely that the mobile phone may have run out of power before help seeking is required. A base station positioning service of a mobile phone is also referred to as a location based service (Location Based Service, LBS). In this service, location information of the mobile phone is obtained by using a mobile communications network. Apparently, base station positioning is unavailable in a place in which there is no mobile phone signal.

Therefore, when people are lost outdoors, how to quickly return to a specific location, for example, a location with a mobile phone signal, to seek help from the outside, has become an urgent problem to be resolved.

SUMMARY

This application provides a method, apparatus, and terminal for obtaining a route, to resolve a problem that a user may encounter a danger because the user cannot quickly return from a location without a mobile phone signal to a location with a mobile phone signal.

To achieve the foregoing objective, the following technical solutions are used in the embodiments of this application:

According to a first aspect, a method for obtaining a route is provided. A terminal obtains a first moment at which a signal in the terminal disappears and first location information of the terminal at the first moment, and performs dead reckoning starting from the first moment. The terminal obtains a second moment at which a user sends a distress signal and second location information of the terminal at the second moment, and ends the dead reckoning, to obtain a first dead reckoning curve from the first moment to the second moment. Finally, the terminal determines a track of a traveled route based on the first moment, the second moment, the first location information, the second location information, the first dead reckoning curve, and each moment between the first moment and the second moment. The track of the traveled route is usable by the user to return from a location identified by the second location information to a location identified by the first location information. In this way, the user can quickly return to a location in which a signal just disappears from a location in which a distress signal is sent. The location in which the signal just disappears is generally close to a location with a signal. Therefore, the user can quickly return to the location with a signal, to seek help from the outside, thereby ensuring personal safety of the user.

In a possible design, if coordinate values of the user at a moment T in the track of the traveled route are $(X_T, Y_T)$, $$X_T = X_T' + (X_{2end} - X_{1end}) * \frac{T - T_{start}}{T_{end} - T_{start}}; \text{ and}$$

$$Y_T = Y_T' + (Y_{2end} - Y_{1end}) * \frac{T - T_{start}}{T_{end} - T_{start}},$$

where $X_T$ is an X-axis coordinate value of the user at the moment T in the traveled route; $X_T'$ is an X-axis coordinate value of the user at the moment T in the first dead reckoning curve; $X_{2end}$ is an X-axis coordinate value in the second location information; $X_{1end}$ is an X-axis coordinate value of the user at the second moment in the first dead reckoning curve; $T_{start}$ is the first moment; and $T_{end}$ is the second moment, and $Y_T$ is a Y-axis coordinate value of the user at the moment T in the traveled route; $Y_T'$ is a Y-axis coordinate value of the user at the moment T in the first dead reckoning curve; $Y_{2end}$ is a Y-axis coordinate value in the second location information; and $Y_{1end}$ is a Y-axis coordinate value of the user at the second moment in the first dead reckoning curve.

In a possible design, before obtaining the first moment, the terminal detects a signal strength. If signal strengths detected N consecutive times are all less than a first threshold, it is determined that the signal disappears. The first threshold may be set to a critical value of a signal strength at which a call can be supported. Therefore, the terminal may perform the dead reckoning from a location in which the signal disappears, and this is conducive to obtaining the track of the traveled route and saving electrical energy of the terminal.

In a possible design, the terminal may obtain the first location information and the second location information by using a satellite positioning system. Specifically, the terminal enables the satellite positioning system to obtain the first location information, and disables the satellite positioning system after obtaining the first location information. The terminal enables the satellite positioning system to obtain the second location information, and disables the satellite positioning system after obtaining the second location information. Because the terminal consumes power rapidly when using the satellite positioning system, a quantity of times of using the satellite positioning system is minimized, to help prolong a standby time of the terminal.

In a possible design, before determining that the signal disappears, the terminal may further detect M consecutive times that signal strengths are all greater than or equal to the first threshold and less than a second threshold, where the second threshold is greater than the first threshold. In this case, the terminal records a third moment, and a location of the user at this moment may be considered as a location in which the terminal has a signal recently. Therefore, the terminal may perform reverse dead reckoning from the first moment to the third moment to obtain a second dead reckoning curve. After returning to the location in which the signal disappears from the location in which the distress signal is sent, the user can quickly return to the location with a signal based on the second dead reckoning curve, so that the user can use the terminal to seek external help.

According to a second aspect, an apparatus for obtaining a route is provided, including: an obtaining unit, configured to obtain a first moment at which a signal in the terminal disappears and first location information of the terminal at the first moment, and perform dead reckoning starting from the first moment, where the obtaining is further configured to obtain a second moment at which a user sends a distress signal and second location information of the terminal, and end the dead reckoning, to obtain a first dead reckoning curve; and a determining unit, configured to determine a track of a traveled route based on the first moment, the second moment, the second location information, the first dead reckoning curve, and each moment between the first moment and the second moment that are obtained by the obtaining unit, where the track of the traveled route is usable by the user to return from a location identified by the second location information to a location identified by the first location information.

In a possible design, if coordinate values of the user at a moment T in the track of the traveled route are ($X_T$, $Y_T$), $$X_T = X_T' + (X_{2end} - X_{1end}) * \frac{T - T_{start}}{T_{end} - T_{start}}; \text{ and}$$

$$Y_T = Y_T' + (Y_{2end} - Y_{1end}) * \frac{T - T_{start}}{T_{end} - T_{start}},$$

$X_T$ is an X-axis coordinate value of the user at the moment T in the traveled route; $X_T'$ is an X-axis coordinate value of the user at the moment T in the first dead reckoning curve: $X_{2end}$ is an X-axis coordinate value in the second location information; $X_{1end}$ is an X-axis coordinate value of the user at the second moment in the first dead reckoning curve; $T_{start}$ is the first moment; and $T_{end}$ is the second moment; and $Y_T$ is a Y-axis coordinate value of the user at the moment T in the traveled route; $Y_T'$ is a Y-axis coordinate value of the user at the moment T in the first dead reckoning curve; $Y_{2end}$ is a Y-axis coordinate value in the second location information; and $Y_{1end}$ is a Y-axis coordinate value of the user at the second moment in the first dead reckoning curve.

In a possible design, the obtaining unit is further configured to detect a signal strength, and the determining unit is further configured to: if the signal strengths detected N consecutive times by the obtaining unit are all less than the first threshold, determine that the signal disappears.

In a possible design, the obtaining unit is further configured to obtain the first location information by using a satellite positioning system; and the obtaining unit is further configured to obtain the second location information by using the satellite positioning system.

In a possible design, the obtaining unit is further configured to: when it is determined to obtain the first location information by using the satellite positioning system, enable the satellite positioning system; and after the first location information is obtained by using the satellite positioning system, disable the satellite positioning system. The obtaining unit is further configured to: when it is determined to obtain the second location information by using the satellite positioning system, enable the satellite positioning system and after the second location information is obtained by using the satellite positioning system, disable the satellite positioning system.

In a possible design, the obtaining unit is further configured to: if signal strengths detected M consecutive times are all greater than or equal to the first threshold and less than a second threshold, record a third moment, where the second threshold is greater than the first threshold; and the obtaining unit is further configured to perform reverse dead reckoning from the first moment to the third moment to obtain a second dead reckoning curve, where the second dead reckoning curve is usable by the user to return from the location identified by the first location information to a location of the user at the third moment.

According to a third aspect, a terminal for obtaining a route is provided, including a memory, a processor, a transceiver, and a bus. The memory is configured to: record a first moment at which a signal in the terminal disappears, and obtain first location information of the terminal at the first moment by using the transceiver. In addition, the processor performs dead reckoning starting from the first moment. The memory is configured to: record a second moment at which a user sends a distress signal, and obtain second location information of the terminal at the second moment by using the transceiver. The processor is further configured to end the dead reckoning, to obtain a first dead reckoning curve from the first moment to the second moment. The processor is further configured to determine a track of a traveled route based on the first moment, the second moment, the second location information, the first dead reckoning curve, and each moment between the first moment and the second moment, where the track of the traveled route is usable by the user to return from a location identified by the second location information to a location identified by the first location information.

In a possible design, if coordinate values of the user at a moment T in the track of the traveled route are ($X_T$, $Y_T$), $$X_T = X_T' + (X_{2end} - X_{1end}) * \frac{T - T_{start}}{T_{end} - T_{start}}; \text{ and}$$

$$Y_T = Y_T' + (Y_{2end} - Y_{1end}) * \frac{T - T_{start}}{T_{end} - T_{start}},$$

where $X_T$ is an X-axis coordinate value of the user at the moment T in the traveled route; $X_T'$ is an X-axis coordinate value of the user at the moment T in the first dead reckoning curve; $X_{2end}$ is an X-axis coordinate value in the second location information; $X_{1end}$ is an X-axis coordinate value of the user at the second moment in the first dead reckoning curve; $T_{start}$ is the first moment; and $T_{end}$ is the second moment; and $Y_T$ is a Y-axis coordinate value of the user at the moment T in the traveled route; $Y_T'$ is a Y-axis coordinate value of the user at the moment T in the first dead reckoning curve; $Y_{2end}$ is a Y-axis coordinate value in the second location information; and $Y_{1_{end}}$ is a Y-axis coordinate value of the user at the second moment in the first dead reckoning curve.

In a possible design, the processor is further configured to detect a signal strength; and the processor is further configured to: if signal strengths detected N consecutive times are all less than a first threshold, determine that the signal disappears.

In a possible design, the processor is further configured to obtain the first location information by using a satellite positioning system. The processor is configured to obtain the second location information by using the satellite positioning system.

In a possible design, the processor is further configured to: when it is determined to obtain the first location information by using the satellite positioning system, enable the satellite positioning system and after the first location information is obtained by using the satellite positioning system, disable the satellite positioning system. The processor is further configured to: when it is determined to obtain the second location information by using the satellite positioning system, enable the satellite positioning system and after the second location information is obtained by using the satellite positioning system, disable the satellite positioning system.

In a possible design, the processor is further configured to: if signal strengths detected M consecutive times are all greater than or equal to the first threshold and less than a second threshold, record a third moment, where the second threshold is greater than the first threshold. The processor is further configured to perform reverse dead reckoning from the first moment to the third moment to obtain a second dead reckoning curve, where the second dead reckoning curve is usable by the user to return from the location identified by the first location information to a location of the user at the third moment.

According to a fourth aspect, an embodiment of this application provides a computer readable storage medium, where the computer readable storage medium stores an instruction. When the instruction runs on a computer, the computer is enabled to perform the method according to any item in the first aspect.

According to a fifth aspect, an embodiment of this application provides a computer program product including an instruction. When the instruction runs on a computer, the computer is enabled to perform the method according to any item in the first aspect.

The embodiments of this application provide the method, apparatus and terminal for obtaining a route. The terminal obtains the first moment at which the signal in the terminal disappears and the first location information of the terminal at the first moment, and performs the dead reckoning starting from the first moment. The terminal obtains the second moment at which the user sends the distress signal and the second moment location information of the terminal at the second moment, and ends the dead reckoning, to obtain the first dead reckoning curve from the first moment to the second moment. Finally, the terminal determines the track of the traveled route based on the first moment, the second moment, the first location information, the second location information, the first dead reckoning curve, and each moment between the first moment and the second moment. In the prior art, positioning can be performed only by using a satellite positioning system. However, when the satellite positioning system is continuously used, power is consumed quickly, and a standby time of a terminal is short. In contrast, in the embodiments of this application, the satellite positioning system is used to obtain the first location information generated when the signal just disappears and the second location information generated when the distress signal needs to be sent. In addition, a relative route of the user from the first moment to the second moment, that is, the first dead reckoning curve, is obtained by using a dead reckoning method. The track of the traveled route is determined based on the first moment, the second moment, the second location information, the first dead reckoning curve, and each moment between the first moment and the second moment, so that the user returns to the location in which the signal just disappears from the location in which the distress signal needs to be sent. Because the location in which the signal just disappears is close to a location with a signal, the user can quickly return to the location with a signal, to send the distress signal.

DESCRIPTION OF EMBODIMENTS

The following clearly describes the technical solutions in the embodiments of this application with reference to the accompanying drawings in the embodiments of this application.

When a user is lost, the user usually thinks of using a mobile phone to seek external help. However, if the user is in the field or other places without mobile phone signals, it is difficult for the user to seek help from the outside. Generally, the user keeps trying to make a call nearby until the mobile phone runs out of power. As a result, the user completely loses an opportunity for seeking external help by using the mobile phone, and therefore the user is in danger. A method provided in the embodiments of this application may be used when the user is in the field and another place in which there is no mobile phone signal and the user may be lost. In this way, the user can quickly return to a place with a mobile phone signal when external help is required, so that the user can call for help as soon as possible before the mobile phone runs out of power, to ensure personal safety.

Figure 1:
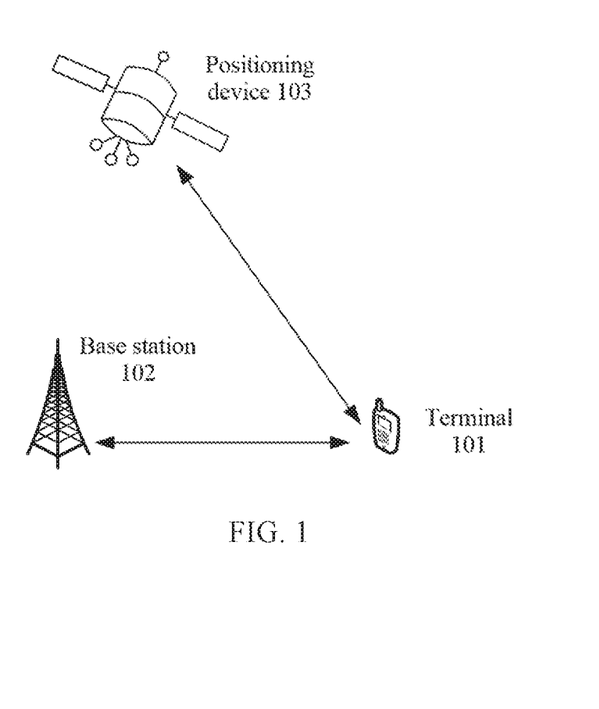
FIG. 1 is a diagram of a network architecture of a communications system according to an embodiment of this application.

Based on the foregoing application scenario, an embodiment of this application provides a communications system. As shown in FIG. 1, the communications system includes a terminal 101, a base station 102, and a positioning device 103. The positioning device 103 may be a satellite or the like. When the terminal 101 sends a positioning request signal, the positioning device 103 may collect a latitude and a longitude of a current location of the terminal 101 and send such location information to the terminal 101. The base station 102 is a radio transceiver station that transmits information between a mobile communications switching center and the terminal 101 in a specific radio coverage area. For example, the mobile communications switching center provides a voice service for the terminal 101 by using the base station 102, and the terminal 101 determines a mobile phone signal strength in this case based on receive power of a signal sent by the base station 102.

Figure 2:
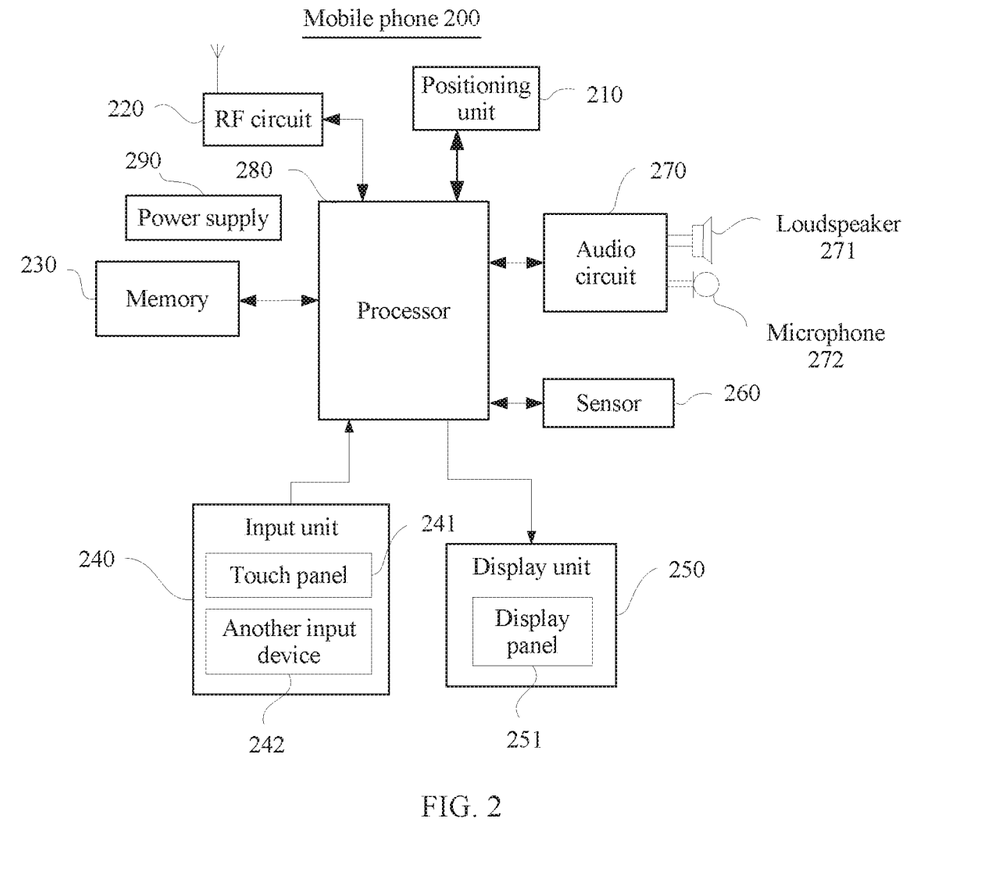
FIG. 2 is a schematic structural diagram of a terminal according to an embodiment of this application.

FIG. 2 is a schematic structural diagram of a terminal according to an embodiment of this application. The terminal provided in this embodiment of this application may be used to perform the method implemented in the embodiments of this application. For ease of description, only a part related to this embodiment of the present invention is shown. For specific technical details that are not disclosed, refer to the embodiments of this application shown in FIG. 3 and FIG. 4.

The terminal may be a terminal device such as a mobile phone, a tablet computer, a notebook computer, a UMPC (Ultra-mobile Personal Computer, ultra-mobile personal computer), a netbook, or a PDA (Personal Digital Assistant, personal digital assistant). In this embodiment of this application, an example in which the terminal is a mobile phone is used for description. FIG. 2 shows a block diagram of a partial structure of a mobile phone 200 related to the embodiments of this application.

As shown in FIG. 2, the mobile phone 200 includes components such as an RF (radio frequency, RF) circuit 220, a memory 230, an input unit 240, a display unit 250, a sensor 260, an audio circuit 270, a processor 280, a power supply 290, and a positioning unit 210. A person skilled in the art may understand that the structure of the mobile phone shown in FIG. 2 does not constitute any limitation on the mobile phone, and the mobile phone may include more or fewer components than those shown in the figure, or combine some components, or have different component arrangements.

The following specifically describes the components of the mobile phone 200 with reference to FIG. 2.

The RF circuit 220 may be configured to receive and send signals in an information sending and receiving process or a call process. In particular, after receiving downlink information from a base station, the RF circuit 220 sends the downlink information to the processor 280 for processing. In addition, the RF circuit 220 sends uplink data to the base station. Generally, the RF circuit includes but is not limited to an antenna, at least one amplifier, a transceiver, a coupler, an LNA (low noise amplifier, low noise amplifier), and a duplexer. In addition, the RF circuit 220 may further communicate with a network and another device through wireless communication. The wireless communication may comply with any communications standard or protocol, including but not limited to GSM (global system of mobile communication, global system for mobile communications), GPRS (general packet radio service, general packet radio service), CDMA (code division multiple access, code division multiple access), WCDMA (wideband code division multiple access, wideband code division multiple access), LTE (long term evolution, long term evolution), an email, and an SMS (short messaging service, Short Message Service).

In this embodiment of this application, the RF circuit 220 is further configured to: detect a signal strength of the mobile phone and send signal strength information of the mobile phone to the processor 280 for processing. For example, the RF circuit 220 may determine the signal strength of the mobile phone in this case based on receive power of a signal received by the terminal and sent by the base station.

The memory 230 may be configured to store a software program and a module. The processor 280 runs the software program and the module stored in the memory 230, to perform various functional applications and data processing of the mobile phone 200. The memory 230 may mainly include a program storage area and a data storage area. The program storage area may store an operating system, an application program required by at least one function (such as an audio play function or an image play function), and the like. The data storage area may store data (such as audio data, image data, or an address book) created based on use of the mobile phone 200, and the like. In addition, the memory 230 may include a high-speed random access memory, and may further include a non-volatile memory, for example, at least one magnetic disk storage device, a flash storage device, or another volatile solid-state storage device.

In this embodiment of this application, the memory 230 may store a software program and data for performing method steps in this embodiment. The data may be, for example, obtained first location information and second location information, time information of a first moment and a second moment, parameter information of the sensor, curve information obtained through dead reckoning (Dead reckoning, DR), and determined traveled route information. The first location information is location information generated when the terminal determines that a signal disappears, the second location information is location information generated when the terminal sends a distress signal, the first moment is a time when the terminal determines that the signal disappears, and the second moment is a time when the terminal sends the distress signal.

The input unit 240 may be configured to: receive entered digital or character information and generate key signal input related to a user setting and function control of the mobile phone 200. Specifically, the input unit 240 may include a touchscreen 141 and another input device 142. The touchscreen 141 is also referred to as a touch panel, and may collect a touch operation (for example, an operation performed by a user on or near the touchscreen 141 by using any proper object or accessory such as a finger or a stylus) performed by the user on or near the touchscreen 141, and drive a corresponding connection apparatus by using a preset program. Optionally, the touchscreen 141 may include two parts: a touch detection apparatus and a touch controller. The touch detection apparatus detects a touch location of the user, detects a signal brought by a touch operation, and transmits the signal to the touch controller. The touch controller receives touch information from the touch detection apparatus, converts the touch information into touch coordinates, and sends the touch coordinates to the processor 280. In addition, the touch controller can receive and execute a command sent by the processor 280. In addition, the touchscreen 141 may be implemented in a plurality of types, for example, a resistive type, a capacitive type, an infrared ray type, and a surface acoustic wave type. The input unit 240 may include the another input device 142 in addition to the touchscreen 141. Specifically, the another input device 142 may include but is not limited to one or more of a physical keyboard, a function key (such as a volume control key or a power key), a track ball, a mouse, and a joystick.

In this embodiment of this application, the user may input a user instruction to the mobile phone by using the input unit 240. For example, the user instruction is an instruction for enabling or disabling a satellite positioning system, an instruction for seeking external help, or an instruction for dialing a call.

The display unit 250 may be configured to display information entered by the user or information provided for the user, and various menus of the mobile phone 200. The display unit 250 may include a display panel 151. Optionally, the display panel 151 may be configured in a form of an LCD (Liquid Crystal Display, liquid crystal display), an OLED (Organic Light-Emitting Diode, organic light-emitting diode), or the like. Further, the touchscreen 141 may cover the display panel 151. After detecting a touch operation performed on or near the touchscreen 141, the touchscreen 151 sends the touch operation to the processor 280 to determine a type of a touch event, and then the processor 280 provides corresponding visual output on the display panel 151 based on the type of the touch event. In FIG. 2, the touchscreen 141 and the display panel 151 are used as two independent components to implement input and input functions of the mobile phone 200. However, in some embodiments, the touchscreen 141 and the display panel 151 may be integrated to implement the input and output functions of the mobile phone 200.

In this embodiment of this application, the processor 280 may display processed mobile phone signal strength information in a form of signal strength bars by using the display unit 250, so that the user learns the signal strength information. The processor 280 may further display a determined track of a traveled route by using the display unit 250, so that the user returns, based on the track of the traveled route, from a location for seeking help to a location in which the signal disappears. In addition, the display unit 250 may further display prompt information generated by the terminal, for example, a prompt indicating that the user has entered an area without signal coverage.

In this embodiment of this application, the mobile phone 200 further includes the sensor 260, including: an acceleration sensor, a gyroscope, a magnetometer, and the like. The sensor 260 may send measured sensor parameter information to the processor 280, so that the processor 280 performs dead reckoning based on the sensor information. In addition, other sensors may be disposed in the mobile phone 200, for example, a gravity sensor (gravity sensor), a barometer, a hygrometer, a thermometer, and an infrared sensor. Details are not described herein.

The audio circuit 270, a loudspeaker 171, and a microphone 172 may provide an audio interface between the user and the mobile phone 20X). The audio circuit 270 may transmit, to the loudspeaker 171, a received electrical signal converted from audio data, and the loudspeaker 171 converts the electrical signal into a sound signal for output. In another aspect, the microphone 172 converts a collected sound signal into an electrical signal, and the audio circuit 270 receives the electrical signal and converts it into audio data, and then outputs the audio data to the RF circuit 220, so that the audio data is sent to, for example, another mobile phone, or the audio data is output to the memory 230 for further processing.

The processor 280 is a control center of the mobile phone 200, connects various parts of the entire mobile phone by using various interfaces and routes, runs or executes the software program and/or the module stored in the memory 230, and invokes data stored in the memory 230, to perform various functions and data processing of the mobile phone 200, so as to perform overall monitoring on the mobile phone. Optionally, the processor 280 may include one or more processing units. Preferably, an application processor and a modem processor may be integrated into the processor 280. The application processor mainly processes an operating system, a user interface, an application program, and the like. The modem processor mainly processes wireless communication. It may be understood that, alternatively, the modem processor may not be integrated into the processor 280.

In this embodiment of this application, the processor 280 may be configured to perform dead reckoning processing and reverse dead reckoning processing. The processor 280 may be further configured to determine the traveled route of the user based on the obtained dead reckoning curve, and the location information and the time information that are stored in the memory 230, so that the user may return from a location identified by the second location information to a location identified by the first location information.

The mobile phone 200 further includes the power supply 290 (such as a battery) that supplies power to each component. Preferably, the power supply may be logically connected to the processor 280 by using a power management system, to implement functions such as charging management, discharging management, and power consumption management by using the power management system.

In this embodiment of this application, the mobile phone 200 further includes the positioning unit 210. The positioning unit may be one of the global positioning system (Global Positioning System, GPS), the global navigation satellite system (Global Navigation Satellite System, GLONASS), and the Beidou positioning system. The positioning unit 210 may be configured to obtain current relatively accurate location information of the mobile phone 200, for example, the first location information and the second location information.

Although not shown in the figure, the mobile phone 200 may further include a Wi-Fi (wireless fidelity, Wireless Fidelity) module, a Bluetooth module, and the like. Details are not described herein.

Figure 3:
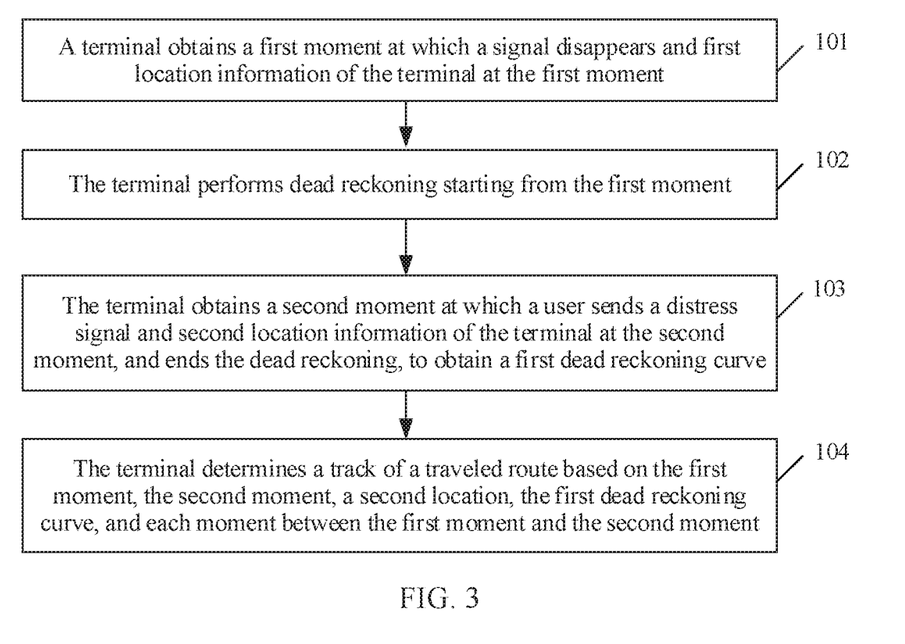
FIG. 3 is a schematic flowchart of a method for obtaining a route according to an embodiment of this application.

As shown in FIG. 3, a method for obtaining a route provided in an embodiment of this application may be applied to the terminal shown in FIG. 2, and specifically includes the following steps.

101. A terminal obtains a first moment at which a signal in the terminal disappears and first location information of the terminal at the first moment.

Specifically, when the terminal starts and runs, the terminal may detect, in real time, a signal strength of an external call signal of the terminal, and determine whether the signal strength of the terminal is less than a first threshold. The terminal may determine the mobile phone signal strength at this moment based on received power of a signal sent by a base station. The first threshold may be set to a critical value of a signal strength at which a call can be supported. Optionally, when the signal strength is the strongest, a display unit of the terminal displays a signal with full signal strength bars. It is assumed that the signal has five signal bars. When the signal strength indicates a 1-bar signal, the terminal may still support a call. However, when the signal strength indicates a signal weaker than a 1-bar signal, the terminal does not support a call. Then, the first threshold may be set to the signal strength of the 1-bar signal.

When signal strengths detected N consecutive times by the terminal are all less than the first threshold, it is determined that the mobile phone signal disappears. In this case, if a user holding the terminal continues walking, the terminal may always fail to detect the mobile phone signal, and consequently, the user cannot send a distress signal when the user needs to contact the outside. To prevent the user from failing to send a distress signal when required later, the terminal needs to start to collect and calculate a parameter value of a route for returning to a location in which the signal disappears from a location in which a distress signal is sent, so that the user can easily find a location with a signal. Therefore, the terminal first records the first moment at which the mobile phone signal disappears, and enables a satellite positioning system to obtain a current location of the terminal, that is, the first location information. After obtaining the first location information, the terminal disables the satellite positioning system. The satellite positioning system herein may be any one of GPS, GLONASS, or the Beidou positioning system. It should be noted that, each procedure for obtaining current location information by using the satellite positioning system is independent. Therefore, the location information obtained by using the satellite positioning system is an absolute location, and an error between the location information obtained by using the satellite positioning system and an actual location is definite, for example, an error of 1 meter. However, the satellite positioning system has high power consumption. Therefore, to minimize power consumption and prolong a standby time of the terminal, the terminal enables the satellite positioning system only when the satellite positioning system needs to be used, and disables the satellite positioning system immediately after the use is complete. In addition, the terminal should reduce a quantity of times of using the satellite positioning system.

102. The terminal performs dead reckoning starting from the first moment.

Specifically, at the first moment starting from a location identified by the first location information, the terminal starts to record, by using sensors (an acceleration sensor, a gyroscope, and a magnetometer) built in the terminal, sensor parameters at moments when the user is walking. These sensor parameters include an acceleration value, a displacement direction, an angular velocity value, a magnetic field direction, and the like. The terminal may obtain relative location information of the terminal at each subsequent moment through calculation based on these sensor parameters in combination with a dead reckoning technology. For example, whether the user is walking may be determined based on the acceleration value, a walking direction of the user may be determined based on an acceleration direction, and then a relative location of the user relative to the first location information at a moment may be determined based on such information in combination with a walking step of the user. Specifically, for specific implementation of the dead reckoning technology, refer to the prior art. Details are not described herein.

It should be noted that the dead reckoning technology is a method for reckoning a location at a next moment by measuring a moving distance and a moving orientation under a condition that a current moment and location information corresponding to the current moment are known. To be specific, relative locations at subsequent moments are reckoned based on the first location information starting from the first moment. Apparently, an error between location information obtained through dead reckoning and an actual location is a cumulative error. To be specific, a longer time of the dead reckoning leads to a larger error between a finally obtained relative location and an actual location. For example, an error between the first location information and the actual location is 1 meter. As a reckoning time increases, the error of the finally obtained relative location may be 10 meters or more, and there is an error in a direction of the dead reckoning. Therefore, a route obtained through the dead reckoning can roughly record a traveled route of the user, but cannot accurately record a subsequent actual location.

103. The terminal obtains a second moment at which a user sends a distress signal and second location information of the terminal at the second moment, and ends the dead reckoning, to obtain a first dead reckoning curve.

Specifically, the second moment is generally a time at which the user needs to return to the first location, or a time at which the user needs to make a call for external help. The terminal enables the satellite positioning system again at the second moment to obtain the relatively accurate second location information. After the second location information is obtained, the satellite positioning system is disabled. In addition, at the second moment, the terminal ends the dead reckoning to obtain the first dead reckoning curve. A first dead reckoning route is a relative traveled route of the user from the first moment to the second moment. The first dead reckoning curve includes relative locations obtained through dead reckoning at moments between the first moment and the second moment.

104. The terminal determines a track of a traveled route based on the first moment, the second moment, the second location information, the first dead reckoning curve, and each moment between the first moment and the second moment.

The track of the traveled route is usable by the user to return from a location identified by the second location information to the location identified by the first location information.

Specifically, the terminal has obtained the second location information and the first dead reckoning curve. The second location information is current location information obtained by using the satellite positioning system, and is a relatively accurate absolute location. The first dead reckoning curve is a relative traveled route of the user from the first moment to the second moment, and is a route combining a group of dense relative location information. In this case, the terminal may correct less accurate relative location information by using the more accurate second location information, to obtain a relatively accurate traveled route, so that the user can return from the second location to the first location.

Optionally, the dead reckoning method is used to reckon a relative location at the second moment based on the first location information at the first moment. Generally, a larger time difference between the second moment and the first moment leads to a larger error between a relative location obtained through the dead reckoning and an actual location. Therefore, when the second location information is used to correct the first dead reckoning curve, a factor of a time difference is considered with emphasis.

Specifically, location information of the user is decomposed into two directions: an X-axis direction and a Y-axis direction. For example, if an east-west direction is the X-axis direction and a north-south direction is the Y-axis direction, each piece of location information of the user includes values in the X-axis direction and the Y-axis direction. It is assumed that the first moment is $T_{start}$, the first location information is $(X_{start}, Y_{start})$, the second moment is $T_{end}$, the second location information is $(X_{2end}, Y_{2end})$, a relative location of the user at the second moment on the first dead reckoning curve is $(X_{1end}, Y_{1end})$, and a relative location of the user at a moment T on the first dead reckoning curve is $(X_T', Y_T')$. In this case, a location $(X_T, Y_T)$ at the moment T on a corrected traveled route may be represented by using the following group of formulas:

$$X_T = X'_T + (X_{2end} - X_{1end}) * \frac{T - T_{start}}{T_{end} - T_{start}}; \text{ and}$$

$$Y_T = Y'_T + (Y_{2end} - Y_{1end}) * \frac{T - T_{start}}{T_{end} - T_{start}}.$$

According to the foregoing formulas, an absolute location of the user at any moment between the first moment and the second moment may be calculated. For example, an error between an absolute location and a relative location that are corresponding to each moment may be obtained at a time interval between the first moment and the second moment, and then absolute location information, that is, the track of the traveled route of the user, of a corresponding moment is obtained based on each piece of relative location information. Therefore, the user can return from the second location to the first location, that is, return to the location in which the signal disappears.

It should be noted that a value of the time interval between the moments may be set according to a requirement of the user. For example, if the user has relatively clear memory of the track of the traveled route, the user needs only location information at several moments in the track to quickly return to the location in which the signal disappears. In this case, the value of the time interval between the moments may be large, to obtain location information at a few moments in the track. If the user does not know the track of the traveled route, the user needs location information at more moments in the track to return to the location in which the signal disappears. In this case, the value of the time interval between the moments may be small, to obtain location information corresponding to more moments.

A time period between a moment at which there is a signal and a moment at which the signal disappears is usually not long, and therefore a location with a signal is not far from the location in which the signal disappears. Therefore, after reaching the location in which the signal just disappears, the user can find a location with a signal nearby. Therefore, the user can seek help by using a mobile phone.

In the prior art, positioning can be performed only by using a satellite positioning system. However, when the satellite positioning system is continuously used, power is consumed quickly, and a standby time of the terminal is short. According to the method for obtaining a route provided in this embodiment of this application, in contrast, in this embodiment of this application, the satellite positioning system is used to obtain the first location information generated when the signal just disappears and the second location information generated when the distress signal needs to be sent. In addition, a relative route of the user from the first moment to the second moment, that is, the first dead reckoning curve, is obtained by using a dead reckoning method. The track of the traveled route is determined based on the first moment, the second moment, the second location information, the first dead reckoning curve, and each moment between the first moment and the second moment, so that the user returns to the location in which the signal just disappears from the location in which the distress signal needs to be sent. Because the location in which the signal just disappears is close to the location with a signal, a relatively accurate traveled route of the user is obtained based on the accurate location information and the relative route. According to a finally obtained traveled route of the user, the user can quickly return to the location with a signal, to send a distress signal.

In addition, the satellite positioning system with high power consumption is used only twice in an entire process, consumption of electrical energy is reduced, and this helps prolong the standby time of the terminal, helps ensure that the user seeks external help by using a mobile phone, and ensures user safety.

Figure 4:
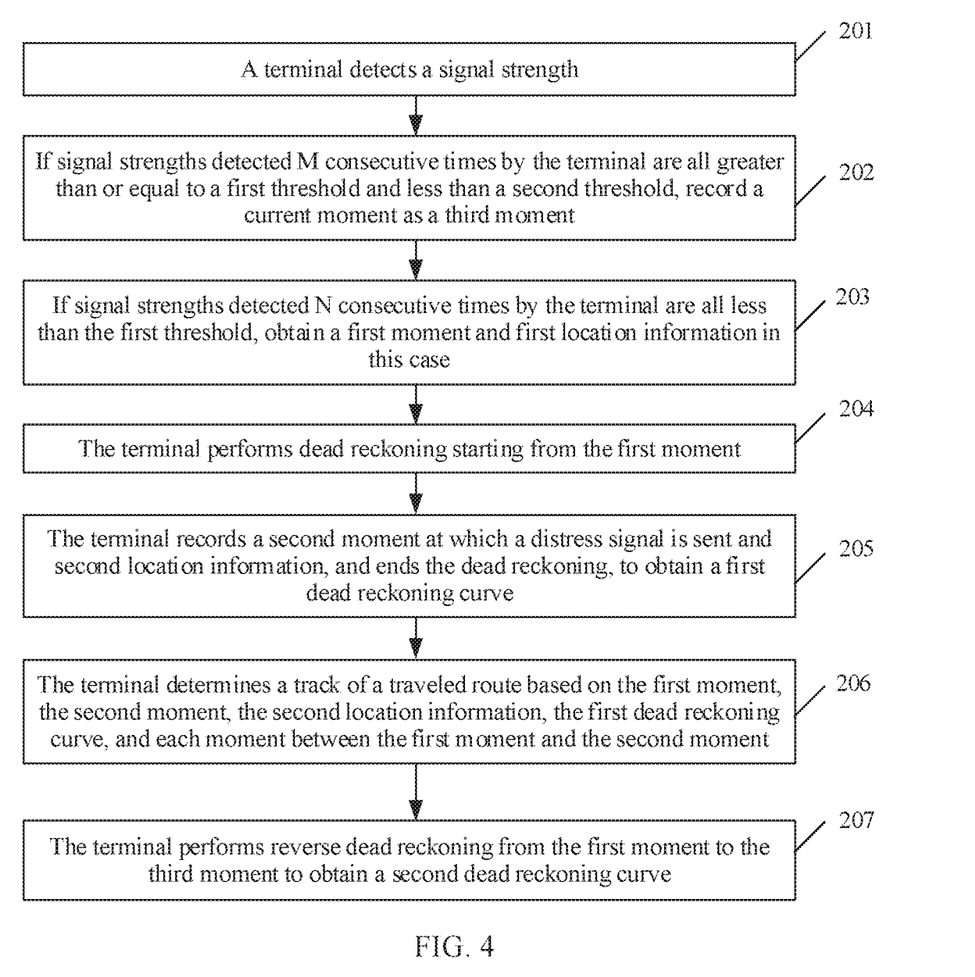
FIG. 4 is a schematic flowchart of another method for obtaining a route according to an embodiment of this application.

Further, when the user wants to return to the location with a signal from the location in which the signal disappears, according to the foregoing track calculation manner, there may be relatively accurate route reference for returning to the location with a signal from the location in which the signal disappears. An embodiment of this application further provides a method for obtaining a route. As shown in FIG. 4, the method specifically includes the following steps.

201. A terminal detects a signal strength.

Specifically, when a user holding the terminal is walking, the terminal can detect a signal strength in real time. After detecting the signal strength, the terminal displays the signal strength by using signal strength bars.

202. If signal strengths detected M consecutive times by the terminal are all greater than or equal to a first threshold and less than a second threshold, record a third moment at this time.

The second threshold is greater than the first threshold.

Specifically, the terminal may determine in real time whether the signal strength is lower than the second threshold. The second threshold may be set to a signal strength value, of a relatively weak signal, that still supports a call. For example, when the signal is weaker than a 1-bar signal, the terminal does not support a call. Then, the first threshold is set to a strength of the 1-bar signal and the second threshold may be set to a strength of a 2-bar signal. In this way, if the signal strengths detected M consecutive times by the terminal are all greater than or equal to the first threshold and less than the second threshold, it may be considered that a location in which the terminal is located when a signal strength greater than or equal to the first threshold and less than the second threshold is detected an $M^{th}$ time may be a location in which the terminal has a mobile phone signal for a last time, for example, a location A in FIG. 4. The third moment at this time is recorded. In this case, a sensor built in the terminal may start to record related sensor parameter information. Sensor parameters may include an acceleration value, a displacement direction, an angular velocity value, a magnetic field direction, and the like. It should be noted that, to save power of the mobile phone, only parameters may be recorded in this case, and no dead reckoning is performed.

203. If signal strengths detected N consecutive times by the terminal are all less than the first threshold, obtain a first moment and first location information in this case.

Specifically, if the user continues walking at a location in which the terminal has a mobile phone signal for a last time, the terminal continues detecting a signal strength in real time. If the signal strengths detected N consecutive times by the terminal are all less than the first threshold, it may be considered that a location in which a signal strength less than the first threshold is detected an $N^{th}$ time is a location in which the mobile phone signal disappears, for example, a location B in FIG. 5. The first moment at this time is recorded. In addition, a satellite positioning system is enabled, and the first location information is obtained. After the first location information is obtained, the satellite positioning system is disabled.

Optionally, in this case, the terminal may generate prompt information, prompting that the user has entered an area without signal coverage. The user may determine, based on a status of the user, whether to return to a place with a signal or ignore the prompt and keep walking.

204. The terminal performs dead reckoning starting from the first moment.

Specifically, the terminal performs dead reckoning on a traveled route of the user based on the sensor parameters recorded by the sensor. For specific implementation, refer to step 102.

205. The terminal records a second moment at which a distress signal is sent and second location information, and ends the dead reckoning, to obtain a first dead reckoning curve.

Figure 5:
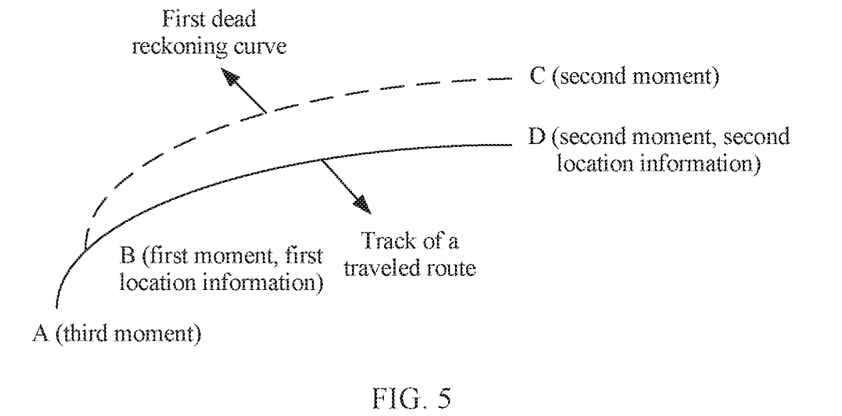
FIG. 5 is a schematic diagram of a dead reckoning curve and a traveled route according to an embodiment of this application.

Specifically, when the user gets lost or requires external help, an interaction interface of the terminal may be used to trigger the terminal to determine the second moment at this time. In this case, the dead reckoning is ended and the first dead reckoning curve is obtained. As shown in FIG. 5, a location C is a relative location at the second moment obtained through the dead reckoning, and a curve from the location A to the location C is the first dead reckoning curve. A first dead reckoning route is a relative traveled route of the user from the first moment to the second moment, and the satellite positioning system is enabled to obtain the second location information, for example, a location D in FIG. 5. After the second location information is obtained, the satellite positioning system is disabled. For specific implementation, refer to step 103.

206. The terminal determines a track of a traveled route based on the first moment, the second moment, the second location information, the first dead reckoning curve, and each moment between the first moment and the second moment.

In this way, based on the determined track of the traveled route, the user can return to the location in which the signal just disappears. As shown in FIG. 5, the user determines, based on the first moment, the second moment, a curve from the location A to the location C, and each moment between the first moment and the second moment, the track of the traveled route, that is, a curve track from the location A to the location D. Based on the curve track, the user can quickly return from the location D to the location B.

For details of this step, refer to step 104. Details are not described herein again.

207. The terminal performs reverse dead reckoning from the first moment to the third moment to obtain a second dead reckoning curve, where the second dead reckoning curve is usable by the user to return from a location identified by the first location information to a location of the user at the third moment.

Specifically, the reverse dead reckoning may be performed based on the first moment to the third moment and the sensor parameters recorded in step 202, to obtain the second dead reckoning curve. The user can return, based on the second dead reckoning curve, to a location in which there is a mobile phone signal for a last time, that is, return from the location B to the location A in FIG. 5. It should be noted that, a time period between a moment at which there is a mobile phone signal for a last time and a moment at which the signal disappears is usually not long, and therefore a location with a signal is not far from the location in which the signal disappears. According to a relative route of the second dead reckoning curve, the user can return to the location in which there is a mobile phone signal for the last time, to be specific, return to the location in which the terminal is located at the third moment when the signal strength greater than or equal to the first threshold and less than the second threshold is detected the $M^{th}$ time.

Therefore, the user can quickly return to the location with a mobile phone signal from a location in which help is required, and the user can seek external help by using the mobile phone, thereby ensuring user safety.

The solutions provided in the embodiments of this application are mainly described above from a perspective of interaction between the devices. It may be understood that, to implement the foregoing functions, devices such as the satellite, the base station, and the terminal include corresponding hardware structures and/or software modules for performing each function. A person skilled in the art should easily be aware that, in combination with the examples described in the embodiments disclosed in this specification, units and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that, in this embodiment of this application, module division is an example, and is merely logical function division. In actual implementation, another division manner may be used.

Figure 6:
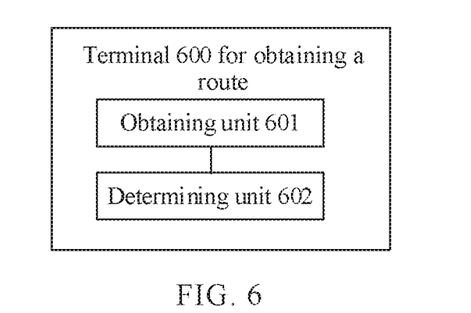
FIG. 6 is a schematic structural diagram of another terminal for obtaining a route according to an embodiment of this application.

When each function module is obtained through division based on each corresponding function, FIG. 6 is a possible schematic structural diagram of the terminal for obtaining a route in the foregoing embodiments. A terminal 600 includes an obtaining unit 601 and a determining unit 602. The obtaining unit 601 is configured to support the terminal in performing the processes 101 to 103 in FIG. 3, and the processes 201 to 205 and 207 in FIG. 4. The determining unit 602 is configured to support the terminal in performing the process 104 in FIG. 3, and the process 206 in FIG. 4. All related content of steps in the foregoing method embodiments may be cited in function descriptions of corresponding function modules. Details are not described herein.

Figure 7:
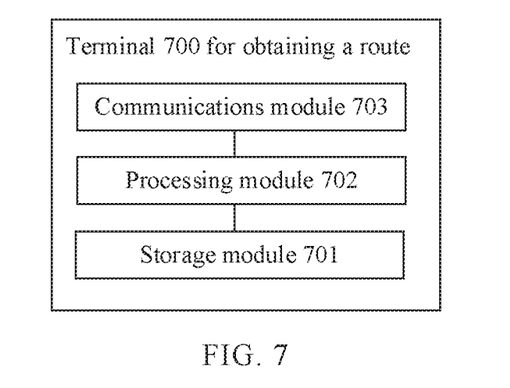
FIG. 7 is a schematic structural diagram of still another terminal for obtaining a route according to an embodiment of this application.

When an integrated unit is used, FIG. 7 is a possible schematic structural diagram of the terminal for obtaining a route in the foregoing embodiments. A terminal 700 includes a storage module 701, a processing module 702, and a communications module 703. The processing module 702 is configured to perform control and management on actions of the terminal. For example, the processing module 702 is configured to support the terminal in performing the processes 101 to 104 in FIG. 3, the processes 201-207 in FIG. 4, and/or another process of a technology described in this specification. The communications module 703 is configured to support communication between the terminal and another network entity, for example, communication between the satellite and the base station shown in FIG. 1. The terminal 700 may further include the storage module 701, configured to store program code and data of the terminal.

The processing module 702 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logical device, a transistor logical device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 703 may be a transceiver, a transceiver circuit, a communications interface, or the like. The storage module 701 may be a memory.

When the storage module 701 of the terminal 700 is a memory, the communications module 703 is a transceiver circuit, and the processing module 702 is a processor, the terminal 700 may be the mobile phone 200 shown in FIG. 2.

Method or algorithm steps described in combination with the content disclosed in this application may be implemented by hardware, or may be implemented by a processor by executing a software instruction. The software instruction may include a corresponding software module. The software module may be stored in a random access memory (Random Access Memory, RAM), a flash memory, a read-only memory (Read Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made within the spirit and principle of the present invention shall fall within the protection scope of this application.

What is claimed is:

1. A method for obtaining a route, comprising:
   detecting, by an electronic device, a signal strength;
   obtaining, by the electronic device, a third moment when the signal strength is greater than or equal to a first threshold and less than a second threshold at least M consecutive times;
   recording, by the electronic device, a sensor parameter without performing dead reckoning;
   continuously detecting, by an electronic device, the signal strength;
   obtaining, by the electronic device, a first moment and a first location of the electronic device at the first moment when the signal strength is less than the first threshold at least N consecutive times;
   performing, by the electronic device, dead reckoning starting from the first moment;
   obtaining, by the electronic device, a second moment at which the electronic device receiving a distress signal and a second location of the electronic device at the second moment;
   obtaining, by the electronic device, a first dead reckoning curve from the first moment to the second moment;
   determining, by the electronic device, a first track of a traveled route based on the first moment, the second moment, the second location information, and the first dead reckoning curve; and
   navigating, by the electronic device, from the second location to the first location based on the first track of a traveled route.

2. The method of claim 1, wherein if coordinate values of a user at a moment T in the track of the traveled route are $(X_T, Y_T)$, $$X_T = X'_T + (X_{2end} - X_{1end}) * \frac{T - T_{start}}{T_{end} - T_{start}}; \text{ and}$$

$$Y_T = Y'_T + (Y_{2end} - Y_{1end}) * \frac{T - T_{start}}{T_{end} - T_{start}},$$

wherein
   $X_T$ is an X-axis coordinate value of the user at the moment T in the traveled route; $X_T'$ is an X-axis coordinate value of the user at the moment T in the first dead reckoning curve; $X_{2end}$ is an X-axis coordinate value in the second location information; $X_{1end}$ is an X-axis coordinate value of the user at the second moment in the first dead reckoning curve; $T_{start}$ is the first moment; and $T_{end}$ is the second moment; and
   $Y_T$ is a Y-axis coordinate value of the user at the moment T in the traveled route; $Y_T'$ is a Y-axis coordinate value of the user at the moment T in the first dead reckoning curve; $Y_{2end}$ is a Y-axis coordinate value in the second location information; and $Y_{1end}$ is a Y-axis coordinate value of the user at the second moment in the first dead reckoning curve.

3. The method of claim 1, wherein the sensor parameter comprises at least one of an acceleration value, a displacement direction, an angular velocity value, or a magnetic field direction.

4. The method of claim 1, wherein each of the first location and the second location is obtained by using a satellite positioning system.

5. The method of claim 4, further comprising:
   after obtaining each of the first location and the second location by using the satellite positioning system, disabling, by the electronic device, the satellite positioning system.

6. The method of claim 1, further comprising:
performing, by the electronic device, reverse dead reckoning from the first moment to the third moment to obtain a second dead reckoning curve.

7. The method of claim 6, further comprising:
navigating, by the electronic device, from the third location to the first location based on the second dead reckoning curve.

8. An electronic device, comprising:
at least one processor; and
a memory coupled to the at least one processor and configured to store programming instructions that, when executed by the at least one processor, cause the electronic device to:
detect a signal strength;
obtain a third moment when the signal strength is greater than or equal to a first threshold and less than a second threshold at least M consecutive times;
record a sensor parameter without performing dead reckoning;
continuously detect the signal strength;
obtain a first moment and a first location of the electronic device at the first moment when the signal strength is less than the first threshold at least N consecutive times;
perform dead reckoning starting from the first moment;
obtain a second moment at which the electronic device receiving a distress signal and a second location of the electronic device at the second moment;
obtain a first dead reckoning curve from the first moment to the second moment;
determine a first track of a traveled route based on the first moment, the second moment, the second location information, and the first dead reckoning curve; and
navigate from the second location to the first location based on the first track of a traveled route.

9. The electronic device of claim 8, wherein if coordinate values of a user at a moment T in the track of the traveled route are $(X_T, Y_T)$, $$X_T = X_T' + (X_{2end} - X_{1end}) * \frac{T - T_{start}}{T_{end} - T_{start}}; \text{ and}$$

$$Y_T = Y_T' + (Y_{2end} - Y_{1end}) * \frac{T - T_{start}}{T_{end} - T_{start}},$$

wherein
$X_T$ is an X-axis coordinate value of the user at the moment T in the traveled route; $X_T'$ is an X-axis coordinate value of the user at the moment T in the first dead reckoning curve; $X_{2end}$ is an X-axis coordinate value in the second location information; $X_{1end}$ is an X-axis coordinate value of the user at the second moment in the first dead reckoning curve; $T_{start}$ is the first moment; and $T_{end}$ is the second moment; and
$Y_T$ is a Y-axis coordinate value of the user at the moment T in the traveled route; $Y_T'$ is a Y-axis coordinate value of the user at the moment T in the first dead reckoning curve; $Y_{2end}$ is a Y-axis coordinate value in the second location information; and $Y_{1end}$ is a Y-axis coordinate value of the user at the second moment in the first dead reckoning curve.

10. The electronic device of claim 8, wherein the sensor parameter comprises at least one of an acceleration value, a displacement direction, an angular velocity value, or a magnetic field direction.

11. The electronic device of claim 8, wherein each of the first location and the second location is obtained by using a satellite positioning system.

12. The electronic device of claim 11, wherein the memory is further configured to store programming instructions that, when executed by the at least one processor, cause the electronic device to:
after obtaining each of the first location and the second location by using the satellite positioning system, disable the satellite positioning system.

13. The electronic device of claim 8, wherein the memory is further configured to store programming instructions that, when executed by the at least one processor, cause the electronic device to:
perform reverse dead reckoning from the first moment to the third moment to obtain a second dead reckoning curve.

14. The electronic device of claim 13, wherein the memory is further configured to store programming instructions that, when executed by the at least one processor, cause the electronic device to:
navigate from the third location to the first location based on the second dead reckoning curve.

15. A non-transitory computer readable medium configured to store instructions that, when executed by an apparatus, cause the apparatus to:
detect a signal strength;
obtain a third moment when the signal strength is greater than or equal to a first threshold and less than a second threshold at least M consecutive times;
record a sensor parameter without performing dead reckoning;
continuously detect the signal strength;
obtain a first moment and a first location of an electronic device at the first moment when the signal strength is less than the first threshold at least N consecutive times;
perform dead reckoning starting from the first moment;
obtain a second moment at which the electronic device receiving a distress signal and a second location of the electronic device at the second moment;
obtain a first dead reckoning curve from the first moment to the second moment;
determine a first track of a traveled route based on the first moment, the second moment, the second location information, the first dead reckoning curve; and
navigate from the second location to the first location based on the first track of a traveled route.

16. The non-transitory computer readable medium of claim 15, wherein if coordinate values of a user at a moment T in the track of the traveled route are $(X_T, Y_T)$, $$X_T = X_T' + (X_{2end} - X_{1end}) * \frac{T - T_{start}}{T_{end} - T_{start}}; \text{ and}$$

$$Y_T = Y_T' + (Y_{2end} - Y_{1end}) * \frac{T - T_{start}}{T_{end} - T_{start}},$$

wherein
$X_T$ is an X-axis coordinate value of the user at the moment T in the traveled route; $X_T'$ is an X-axis coordinate value of the user at the moment T in the first dead reckoning curve; $X_{2end}$ is an X-axis coordinate value in the second location information; $X_{1end}$ is an X-axis coordinate value of the user at the second moment in the first dead reckoning curve; $T_{start}$ is the first moment; and $T_{end}$ is the second moment; and $Y_T$ is a Y-axis coordinate value of the user at the moment T in the traveled route; $Y_T'$ is a Y-axis coordinate value of the user at the moment T in the first dead reckoning curve; $Y_{2end}$ is a Y-axis coordinate value in the second location information; and $Y_{1end}$ is a Y-axis coordinate value of the user at the second moment in the first dead reckoning curve.

17. The non-transitory computer readable medium of claim 15, wherein the sensor parameter comprises at least one of an acceleration value, a displacement direction, an angular velocity value, or a magnetic field direction.

18. The non-transitory computer readable medium of claim 15, wherein each of the first location and the second location is obtained by using a satellite positioning system.

19. The non-transitory computer readable medium of claim 18, wherein the non-transitory computer readable medium is further configured to store instructions that, when executed by an apparatus, cause the apparatus to:
after obtaining each of the first location and the second location by using the satellite positioning system, disable the satellite positioning system.

20. The non-transitory computer readable medium of claim 15, wherein the non-transitory computer readable medium is further configured to store instructions that, when executed by an apparatus, cause the apparatus to:
perform reverse dead reckoning from the first moment to the third moment to obtain a second dead reckoning curve.

* * * * *